US011131906B2

(12) United States Patent
Shan et al.

(10) Patent No.: US 11,131,906 B2
(45) Date of Patent: Sep. 28, 2021

(54) PHOTOGRAPHY ASSISTANT DEVICE

(71) Applicant: WINNERS' SUN PLASTIC & ELECTRONIC (SHENZHEN) CO., LTD., Shenzhen (CN)

(72) Inventors: Jinghua Shan, Shenzhen (CN); Yi Bing Peng, Shenzhen (CN)

(73) Assignee: WINNERS' SUN PLASTIC & ELECTRONIC (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/718,206

(22) Filed: Dec. 18, 2019

(65) Prior Publication Data

US 2020/0387054 A1    Dec. 10, 2020

(30) Foreign Application Priority Data

Jun. 6, 2019  (CN) .......................... 201920852907.9

(51) Int. Cl.
*G03B 17/56* (2021.01)
*F16M 13/04* (2006.01)

(52) U.S. Cl.
CPC .......... *G03B 17/561* (2013.01); *F16M 13/04* (2013.01)

(58) Field of Classification Search
CPC ........ F16M 11/00; F16M 11/02; F16M 11/04; F16M 11/041; F16M 13/04; G03B 17/00; G03B 17/56; G03B 17/561; G03B 17/563; G03B 17/566

See application file for complete search history.

(56) References Cited

U.S. PATENT DOCUMENTS

| 2016/0165025 A1* | 6/2016 | Sheu ....................... H04M 1/04 455/557 |
| 2016/0295096 A1* | 10/2016 | Lever ....................... H01Q 1/22 |
| 2017/0171371 A1* | 6/2017 | Jannard ................ H04N 5/2252 |
| 2018/0109130 A1* | 4/2018 | Lin ......................... H01R 27/02 |

FOREIGN PATENT DOCUMENTS

CN    109151142 A    *  1/2019   ......... H04M 1/0281

* cited by examiner

*Primary Examiner* — Clayton E. LaBalle
*Assistant Examiner* — Fang-Chi Chang

(57) ABSTRACT

The present disclosure relates to a photography assistant device, including a handheld base convenient to be tightly grasped by hand; a clamping mechanism for clamping a mobile phone; a wireless remote controller provided with a camera button; and an expandable function module; the clamping mechanism is disposed on the handheld base, the wireless remote controller and the expandable function module are detachably disposed on the handheld base. When using the photography assistant device, the mobile phone is clamped on the clamping mechanism, the handheld base is held by hands, the camera button is pressed, and a single-hand photographing is realized. Due to a fact that there is no arrangement of the telescopic rod on the photography assistant device, the volume of the photography assistant device is small, which is convenient to carry.

18 Claims, 7 Drawing Sheets

PHOTOGRAPHY ASSISTANT DEVICE

TECHNICAL FIELD

The present disclosure relates to a technical field of mobile phone accessories, and in particular to a photography assistant device.

BACKGROUND

With continuous improvement and enhancement of a camera function of mobile phones, self-photography is a routine operation, but it is often inconvenient for a user to hold a mobile phone with one hand and to press a camera button of the mobile phone using the other hand when taking selfies.

At present, self-photography is facilitated by mainly using flexibility of a selfie stick, but a telescopic structure of the selfie stick is complex, production cost is high and volume is relatively large, making the selfie stick inconvenient to carry. Thus, it is necessary to design a self-photographing device which is more convenient to use.

SUMMARY

An object of the present disclosure is to provide a photography assistant device with smaller volume and more convenient to use.

A technical solution to solve the technical problem thereof adopted by the present disclosure is as follows.

The present disclosure provides a photography assistant device including a handheld base convenient to be tightly grasped by hand; a clamping mechanism for clamping a mobile phone; a wireless remote controller provided with a camera button; and an expandable function module; the clamping mechanism is disposed on the handheld base, the wireless remote controller and the expandable function module are detachably disposed on the handheld base.

Furthermore, a clamping groove is disposed on the handheld base, a convex block is disposed on the expandable function module and matches with the clamping groove, and the convex block is engaged with the clamping groove to make the expandable function module disposed on the handheld base.

Furthermore, the convex block is disposed on the handheld base, the clamping groove is disposed on the expandable function module and matches with the convex block, and the clamping groove is engaged with the convex block to make the expandable function module disposed on the handheld base.

Furthermore, the handheld base includes a bottom plate and a handheld portion, the clamping mechanism is disposed on the bottom plate, when the mobile phone is clamped on the clamping mechanism and abuts against one side of the bottom plate, the handheld portion is disposed on another side of the bottom plate; a cavity for accommodating a storage battery is disposed inside the handheld portion.

Furthermore, the clamping mechanism includes an object stage and a clamping portion, the object stage and the clamping portion clamp the mobile phone, the object stage is fixed on the bottom plate, the clamping portion is disposed on the bottom plate by a spring stretching assembly.

Furthermore, a bottom surface of the object stage, a bottom surface of the bottom plate and a bottom surface of the handheld portion jointly form a bottom plane. The bottom plane makes the photography assistant device placed upright.

Furthermore, a groove is formed on the handheld portion and matches with human body fingers.

Furthermore, the expandable function module is a mobile power supply module.

Furthermore, the expandable function module includes a first housing; a first storage battery, a first circuit board, an input interface and an output interface are disposed on the first housing; and the first circuit board is electrically connected with the first storage battery, the input interface and the output interface respectively.

Furthermore, a first inserting hole corresponding to the output interface and a second inserting hole corresponding to the input interface are disposed on the first housing.

Furthermore, an indicating lamp is disposed on the first housing and the indicating lamp is electrically connected with the first circuit board.

Furthermore, the expandable function module is T-shaped.

Furthermore, a second storage battery is disposed inside the handheld base; when the expandable function module is detachably disposed on the handheld base, the second storage battery is electrically connected with the first circuit board and the first storage battery charges the second storage battery.

Furthermore, the extended function module is a wireless charging module.

Furthermore, the expandable function module includes a second housing, a wireless charging coil and a second circuit board are disposed inside the second housing, and the wireless charging coil is electrically connected with the second circuit board.

Furthermore, the second storage battery is disposed inside the handheld base. When the expandable function module detachably disposed on the handheld base, the second storage batter is electrically connected with the second circuit board, the second storage battery supplies electricity to the wireless charging coil.

Furthermore, the expandable function module is a baffle module.

Furthermore, the expanded function hole includes a third housing, and a first toggle groove is disposed on the third housing.

Compared with the prior art, the present disclosure provides a photography assistant device. At the time of using the photography assistant device, the mobile phone is clamped on the clamping mechanism, the handheld base is held by hands, the camera button is pressed, and a single-hand photographing is realized. Due to a fact that there is no arrangement of a telescopic rod on the photography assistant device, volume of the photography assistant device is small, which is convenient to carry. Meanwhile, the expandable function module is further disposed on the handheld base, such that functions of the photography assistant device are expanded and the photography assistant device is more convenient to use.

BRIEF DESCRIPTION OF DRAWINGS

The present disclosure will be further described below in conjunction with the accompanying drawings and embodiments, wherein.

DETAILED DESCRIPTION

The embodiments of the present disclosure are described below in detail with reference to the accompanying drawings.

Figure 1:
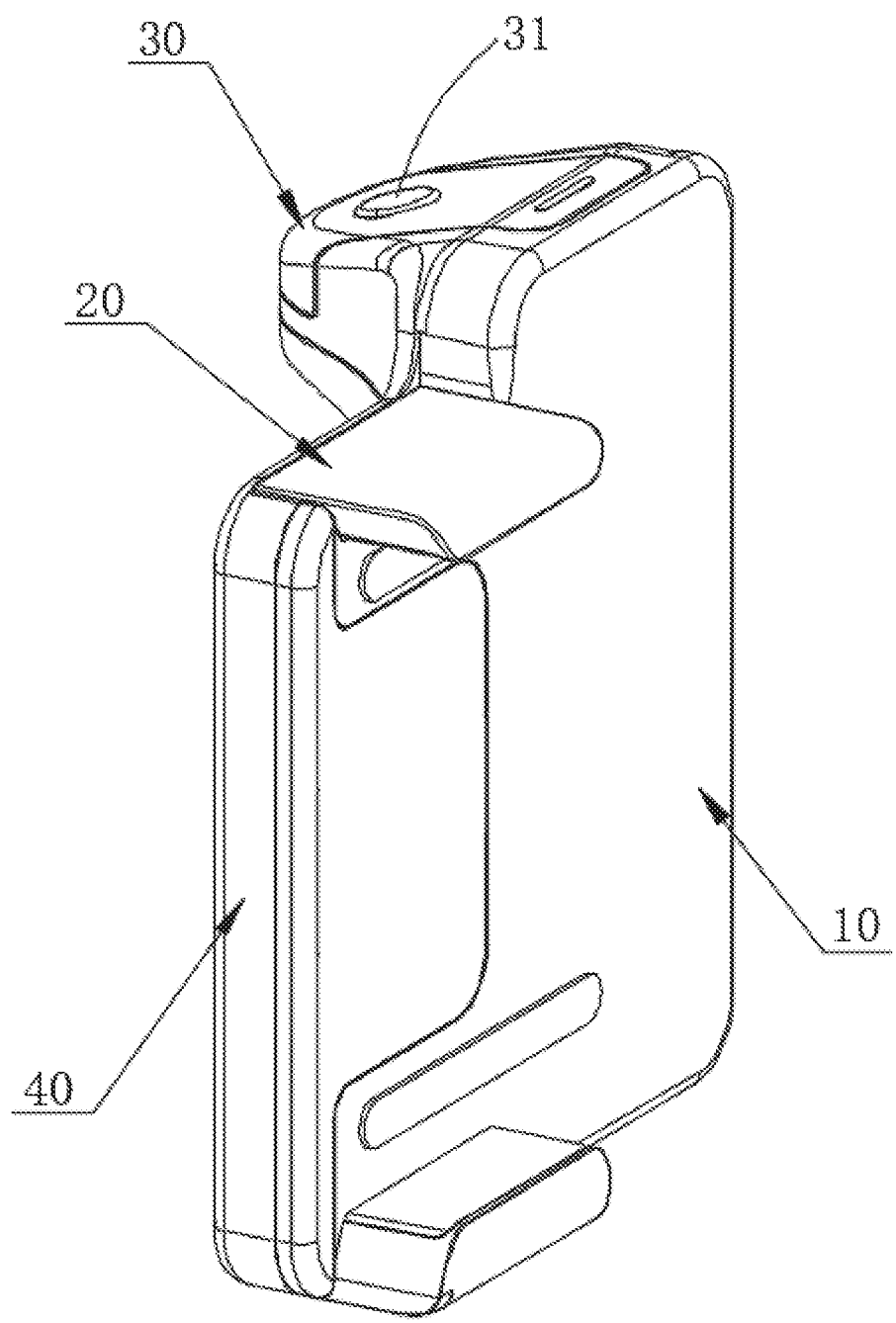
FIG. 1 is a perspective schematic diagram of a photography assistant device of the present disclosure.

As shown in FIG. 1, the present disclosure provides a photography assistant device, including a handheld base 10 which is convenient to tightly grasp by hand, a clamping mechanism 20 for clamping a mobile phone, a wireless remote controller 30 provided with a camera button 31, and an expandable function module 40. The clamping mechanism 20 is disposed on the handheld base 10, and the wireless remote controller 30 and the expandable function module 40 are detachably disposed on the handheld base 10. When the photography assistant device is used, the mobile phone is clamped on the clamping mechanism 20, the handheld base 10 is held by a hand, the camera button 31 is pressed, and single-handed photographing is realized. Due to a fact that there is no arrangement of a telescopic rod on the photography assistant device, volume of the photography assistant device is small, which is convenient to carry. Meanwhile, the expandable function module 40 is further disposed on the handheld base 10, so that functions of the photography assistant device are expanded and the photography assistant device is more convenient to use.

Figure 2:
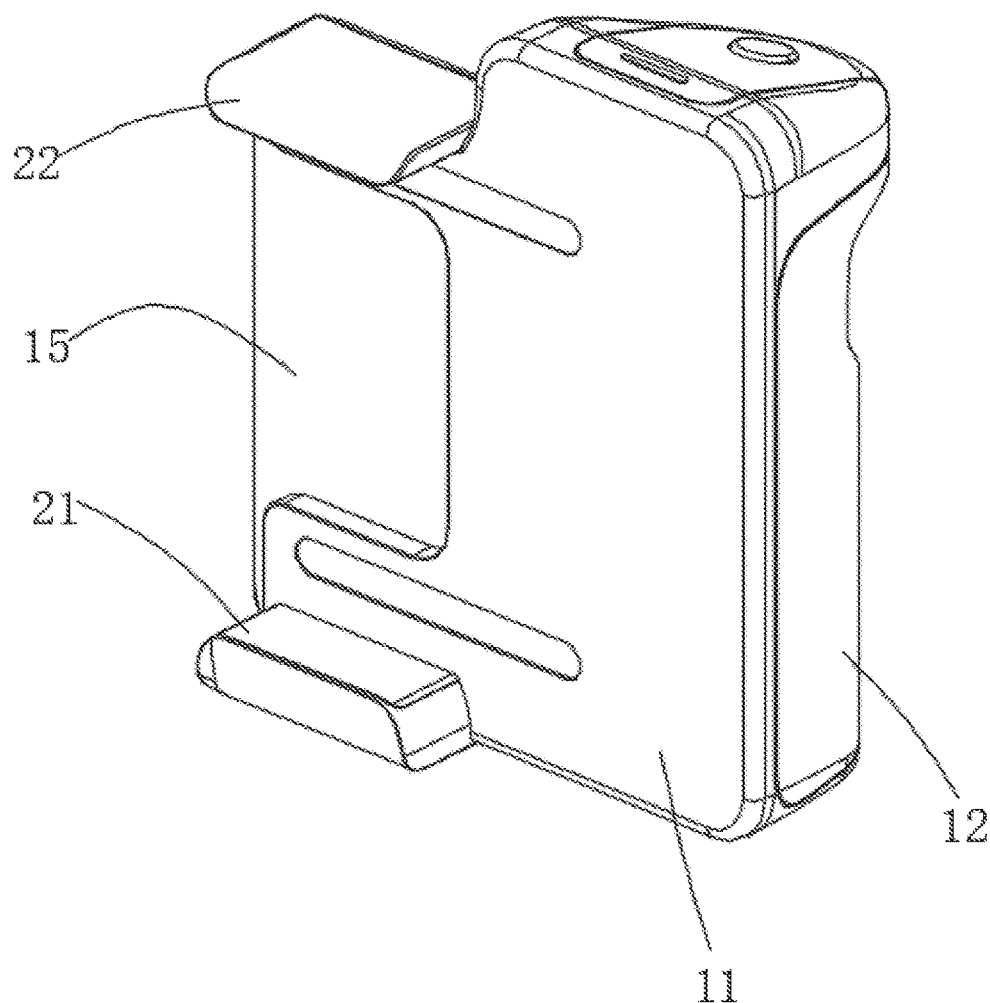
FIG. 2 is a perspective schematic diagram of the photography assistant device shown in FIG. 1 removed an expandable function module.

As shown in FIG. 2, the handheld base 10 includes a bottom plate 11 and a handheld portion 12, where the clamping mechanism 20 is disposed on the bottom plate 11. When the mobile phone is clamped on the clamping mechanism 20, the mobile phone abuts against one side of the bottom plate 11. The handheld portion 12 is disposed on another side of the bottom plate 11. A cavity (not shown in the drawing) for accommodating a storage battery is disposed inside the handheld portion 12 to make full use of space.

In one embodiment, the clamping mechanism 20 includes an object stage 21 and a clamping portion 22, where the object stage 21 and the clamping portion 22 clamp the mobile phone. The object stage 21 is fixed on the bottom plate 11, and the clamping portion 22 is disposed on the bottom plate 11 by a spring stretching assembly. The clamping portion 22 is able to stretch relative to the object stage 21, so that the mobile phone is clamped between the object stage 21 and clamping portion 22.

Figure 3:
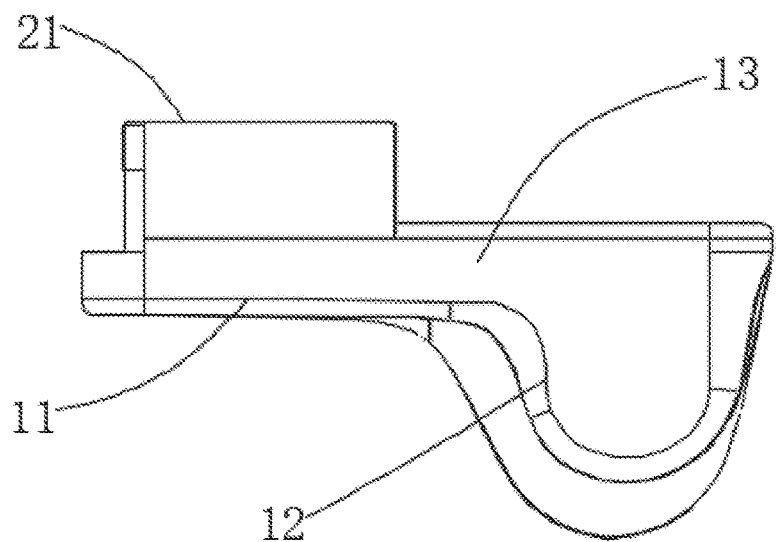
FIG. 3 is a bottom plan schematic diagram of FIG. 2.

Reference is made to FIG. 3, a bottom surface of the object stage 21, a bottom surface of the bottom plate 11 and a bottom surface of the handheld portion 12 jointly form a bottom plane 13, the bottom plane 13 makes the photography assistant device placed upright. The photography assistant device is placed upright in a table through the bottom plane 13 and a long-distance self-photography is realized through the wireless remote controller 30.

In one embodiment, in order to press the camera button 31 conveniently, the camera button 31 is detachably disposed on a top surface of the handheld portion 12. Specifically, the camera button 31 is disposed on the handheld portion 12 by modes of clamping or magnetic attraction.

Figure 4:
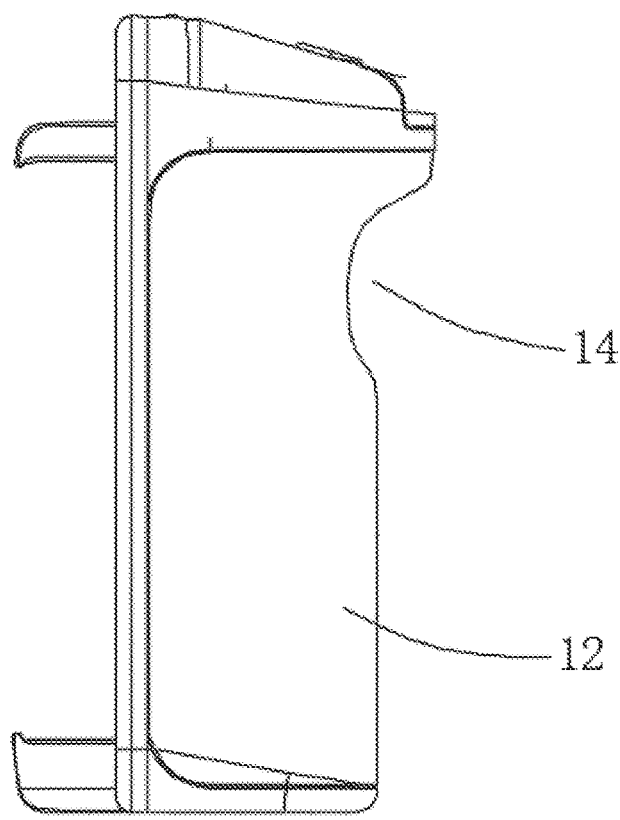
FIG. 4 is a right side elevational schematic diagram of FIG. 2.

As shown in FIG. 4, a groove 14 is formed on the handheld portion 12 and matches with human body fingers. When a hand holds the photography assistant device, the fingers are located in the groove 14, which prevents the fingers from sliding, and makes holding by the hand more stable.

Figure 5:
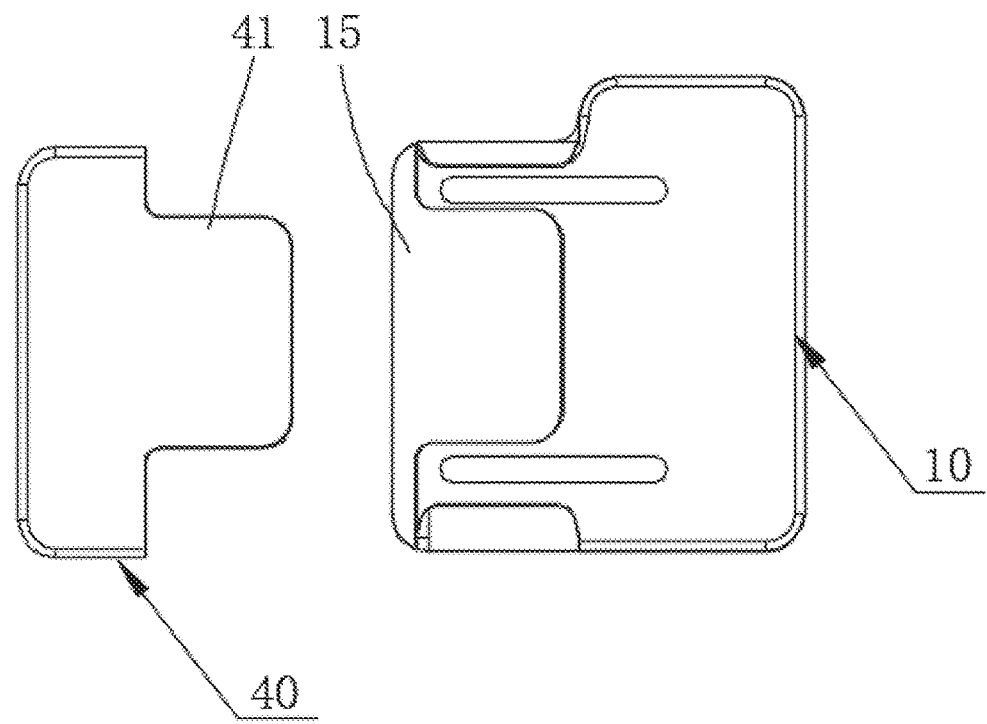
FIG. 5 is an exploded schematic diagram of the photography assistant device shown in FIG. 1.

As shown in FIG. 5, a clamping groove 15 is disposed on the handheld base 10, a convex block 41 is disposed on the expandable function module 40 and matches with the clamping groove 15, and the convex block is engaged with the clamping groove to make the expandable function module disposed on the handheld base 10.

In other embodiments, the convex block is disposed on the handheld base 10, the clamping groove is disposed on the expandable function module 40 and matches with the convex block, and the clamping groove is engaged with the convex block to make the expandable function module disposed on the handheld base 10, which is also possible.

The expandable function module 40 may have a variety of functions, which is disposed according to actual needs. The present disclosure sets following three functions as examples:

1. The expandable function module 40 is a mobile power supply module. The mobile power supply module charges the mobile phone and also charges the storage battery inside the handheld base 10.

Figure 6:
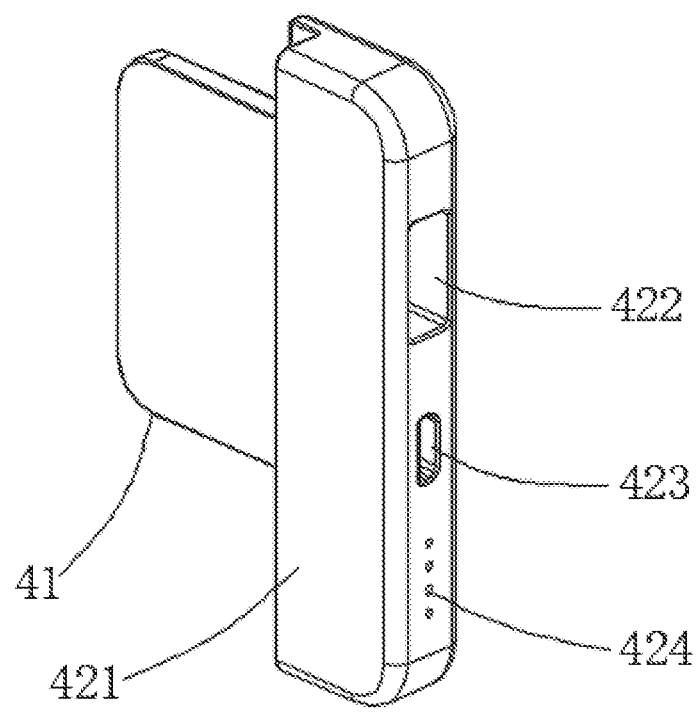
FIG. 6 is a perspective schematic diagram of a mobile power supply module.

As shown in FIG. 6, the expandable function module 40 includes a first housing 421. A first storage battery, a first circuit board, an input interface and an output interface are disposed on the first housing 421. The first circuit board is electrically connected with the first storage battery, the input interface and the output interface respectively. A first inserting hole 422 corresponding to the output interface and a second inserting hole 423 corresponding to the input interface are disposed on the first housing 421. In this way, the mobile phone is charged through the output interface and the first storage battery is charged through the input interface.

Furthermore, an indicating lamp 424 is disposed on the first housing 421 and electrically connected with the first circuit board. The indicating lamp 424 is configured to display a charging state or a power transmission state.

Figure 7:
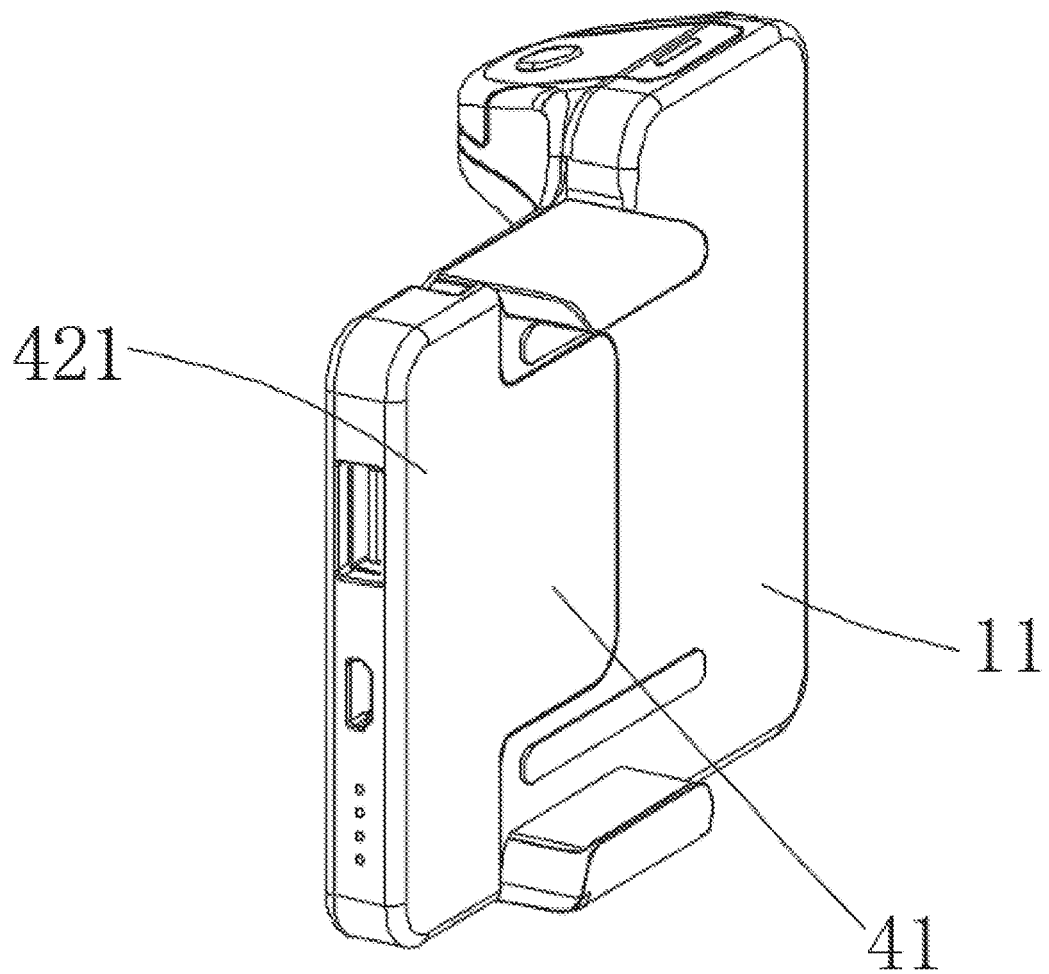
FIG. 7 is a schematic diagram of the mobile power supply module shown in FIG. 6 matches with a handheld base.

In one embodiment, the output interface is a USB female base, and the input interface is a micro USB female base. The convex block 41 is disposed on the first housing 421. Specifically, the convex block 41 and the first housing 421 are integrally formed, which is convenient to process. The expanded function module 40 is T-shaped. After being clamped, the expandable function module 40 is capable to be formed into a whole with the bottom plate 11; an overall appearance is maintained (as shown in FIG. 7).

Furthermore, a second storage battery is disposed inside the handheld base 10 (not shown in the drawings); the second storage battery is disposed inside the cavity of the handheld portion 12. When the convex block 41 is engaged with the clamping groove 15 to make the expandable function module 40 disposed on the handheld base 10, the second storage battery is electrically connected with the first circuit board, and the first storage battery charges the second storage battery. For example, a first electric connecting portion is capable to be disposed on the convex block 41, and the first electric connecting portion is electrically connected with the second storage battery. A second electric connecting portion is disposed inside the clamping groove 15, and the second electric connecting portion is electrically connected with the second storage battery, thus, charging of the second storage battery by the first storage battery is realized through a conductive contact between the first electric connecting portion and the second electric connecting portion.

2. The expandable function module 40 is a wireless charging module. The wireless charging module realizes a wireless charging for the mobile phone.

Figure 8:
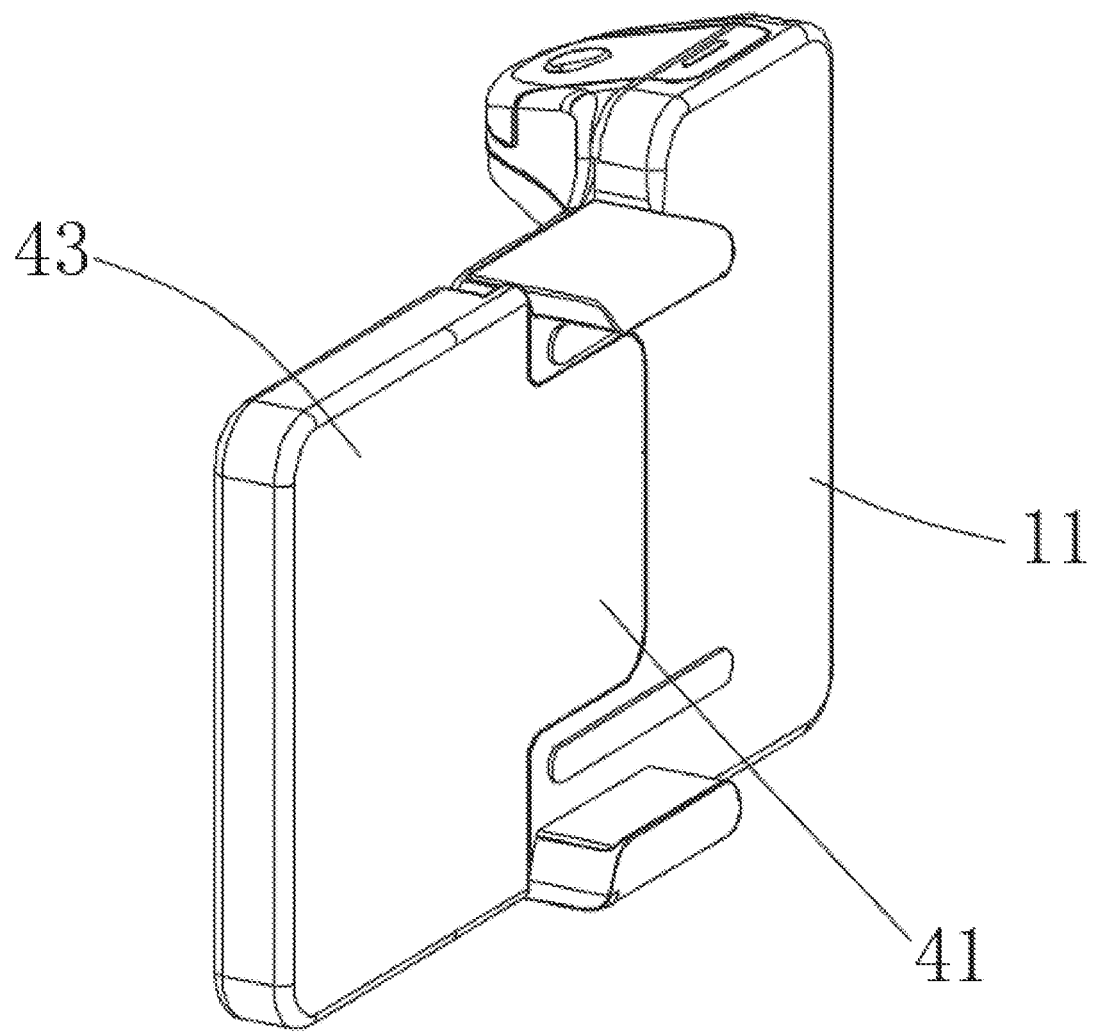
FIG. 8 is a schematic diagram illustrated that a wireless charging module is matched with the handheld.

As shown in FIG. 8, the expandable function module 40 includes a second housing 43. A wireless charging coil and a second circuit board (not shown in the drawings) are disposed inside the second housing 43. The wireless charging coil is electrically connected with the second circuit board; the mobile phone is capable to be wirelessly charged through the wireless charging coil. The convex block 41 is disposed on the second housing 43. The convex block 41 and the second housing 43 are integrally formed, which is convenient to process. The expanded function module 40 is T-shaped. After clamped with the bottom plate 11, the expandable function module 40 and the bottom plate 11 are formed into a whole, and an overall appearance is maintained.

In one embodiment, the second storage battery is disposed inside the handheld base 10; the second storage battery is disposed inside the cavity of the handheld portion 12. When the convex block 41 is engaged with the clamping groove 15 to make the expandable function module 40 disposed on the handheld 10, the second storage battery is electrically connected with the second circuit board, the second storage battery supplies electricity to the wireless charging coil, and then the wireless charging coil charges the mobile phone. Of course, the wireless charging coil is able to be charged by an external power supply.

3. The expandable function module 40 is a baffle module. Due to the fact that the clamping mechanism 20 is disposed close to an edge of the bottom plate 11, thus, the baffle module is mainly configured to abut against the mobile phone and fill the clamping groove 15, so that two sides of the mobile phone are clamped, which is more stable and attractive.

Figure 9:
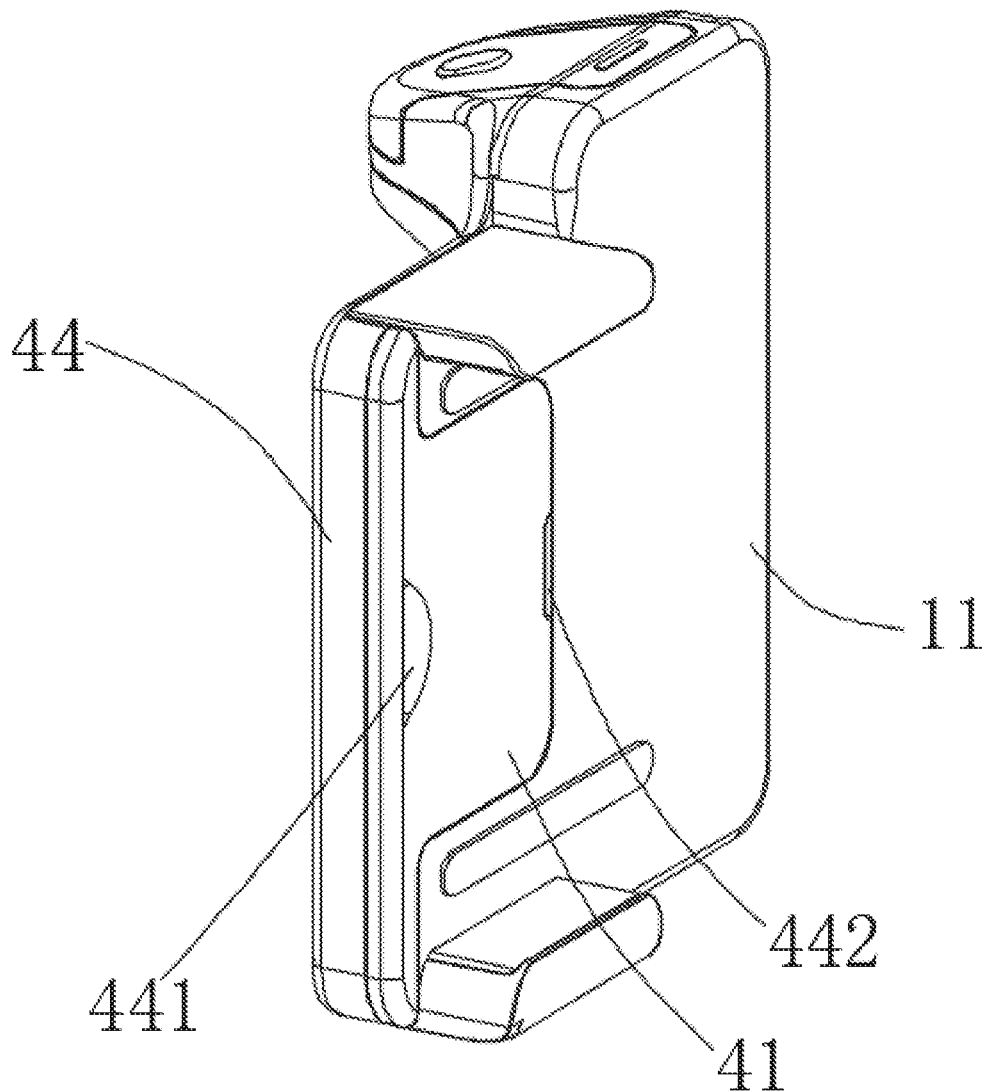
FIG. 9 is a schematic diagram illustrated that a baffle module is matched with the handheld base.

As shown in FIG. 9, the expandable function module 40 includes a third housing 44, a first toggle groove 441 is disposed on the third housing. The convex block 41 is disposed on the third housing 44; a second toggle groove 442 is disposed on the convex block 41. The first toggle groove 441 and the second toggle groove 442 are both configured to conveniently disassemble the third housing 44.

Compared with the prior art, the present disclosure provides a photography assistant device. When using the photography assistant device, the mobile phone is clamped on the clamping mechanism 20, the handheld base 10 is held by hands, the camera button 31 is pressed, and a single-hand photographing is realized. Due to a fact that there is no arrangement of the telescopic rod on the photography assistant device, the volume of the photography assistant device is small, which is convenient to carry. Meanwhile, the expandable function module 40 is further disposed on the handheld base 10, such that the three functions of the photography assistant device are switched to be used and the photographing auxiliary is more convenient to use.

It should be understood, the embodiments above are only used to illustrate the technical solutions of the present disclosure, and not for limitation thereto. The personnel skilled in this field can modify the technical solutions recorded in the embodiments or replace parts of the technical features equivalently. But any modifications and equivalent substitutions are intended to be made within the protective scope of the appended claims of the present disclosure.

What is claimed is:

1. A photography assistant device, comprising:
   a handheld base convenient to tightly grasp by hand;
   a clamping mechanism for clamping a mobile phone;
   a wireless remote controller provided with a camera button; and
   an expandable function module, wherein the clamping mechanism is disposed on the handheld base, the wireless remote controller and the expandable function module are detachably disposed on the handheld base;
   wherein the handheld base comprises a bottom plate and a handheld portion;
   the bottom plate has a first surface and a second surface opposite to the first surface, each of the first surface and the second surface comprises a first side and a second side, the first side of the first surface opposing the first side of the second surface, and the second side of the first surface opposing the second side of the second surface;
   the handheld portion is disposed on the first side of the first surface,
   the clamping mechanism is disposed on the second side of the second surface,
   the clamping mechanism comprises an object stage and a clamping portion, the object stage and the clamping portion clamp the mobile phone, the object stage is fixed on the bottom plate, the clamping portion is disposed on the bottom plate by a spring stretching assembly; and
   a bottom surface of the object stage, a bottom surface of the bottom plate and a bottom surface of the handheld portion jointly form a bottom plane, the bottom plane makes the photography assistant device placed upright.

2. The photography assistant device according to claim 1, wherein a clamping groove is disposed on the handheld base, a convex block is disposed on the expandable function module and matches with the clamping groove, the convex block is engaged with the clamping groove to make the expandable function module disposed on the handheld base.

3. The photography assistant device according to claim 2, wherein the expandable function module is a mobile power supply module.

4. The photography assistant device according to claim 1, wherein a convex block is disposed on the handheld base, a clamping groove is disposed on the expandable function module and matches with the convex block, the clamping groove is engaged with the convex block to make the expandable function module disposed on the handheld base.

5. The photography assistant device according to claim 1, wherein a cavity for accommodating a storage battery is disposed inside the handheld portion.

6. The photography assistant device according to claim 5, wherein a groove is formed on the handheld portion and matches with human body fingers.

7. The photography assistant device according to claim 5, wherein an expandable function module is a mobile power supply module.

8. The photography assistant device according to claim 1, the expandable function module is a mobile power supply module.

9. The photography assistant device according to claim 8, wherein the expandable function module comprises a first housing; a first storage battery, a first circuit board, an input interface and an output interface are disposed on the first housing; and the first circuit board is electrically connected with the first storage battery, the input interface and the output interface respectively.

10. The photography assistant device according to claim 9, wherein a first inserting hole corresponding to the output interface and a second inserting hole corresponding to the input interface are disposed on the first housing.

11. The photography assistant device according to claim 9, wherein an indicating lamp is disposed on the first housing and the indicating lamp is electrically connected with the first circuit board.

12. The photography assistant device according to claim 9, wherein the expandable function module is T-shaped.

13. The photography assistant device according to claim 9, wherein a second storage battery is disposed inside the handheld base; when the expandable function module is detachably disposed on the handheld base, the second storage battery is electrically connected with the first circuit board and the first storage battery charges the second storage battery.

14. The photography assistant device according to claim 1, wherein the expandable function module is a wireless charging module.

15. The photography assistant device according to claim 14, wherein the expandable function module comprises a second housing, a wireless charging coil and a second circuit board are disposed inside the second housing, the wireless charging coil is electrically connected with the second circuit board.

16. The photography assistant device according to claim 15, wherein a second storage battery is disposed inside the handheld base; when the expandable function module detachably disposed on the handheld base, the second storage battery is electrically connected with the second circuit board, the second storage battery supplies electricity to the wireless charging coil.

17. The photography assistant device according to claim 1, wherein the expandable function module is a baffle module.

18. The photography assistant device according to claim 17, wherein the expandable function module comprises a third housing, a first toggle groove is disposed on the third housing.

* * * * *